United States Patent
Herzberg et al.

(10) Patent No.: US 10,997,418 B2
(45) Date of Patent: *May 4, 2021

(54) AUGMENTED, VIRTUAL AND MIXED-REALITY CONTENT SELECTION AND DISPLAY

(71) Applicant: AR, LLC, Nassau (BS)

(72) Inventors: Stefan W. Herzberg, Nassau (BS); Megan Herzberg, Nassau (BS)

(73) Assignee: AR, LLC, Nassau (BS)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,236

(22) Filed: Jun. 4, 2020

(65) Prior Publication Data

US 2021/0073543 A1   Mar. 11, 2021

Related U.S. Application Data

(63) Continuation-in-part of application No. 16/565,234, filed on Sep. 9, 2019, now Pat. No. 10,699,124.

(60) Provisional application No. 62/966,503, filed on Jan. 27, 2020.

(51) Int. Cl.
  *G06K 9/00*    (2006.01)
  *G06Q 30/02*   (2012.01)
  *G06T 11/00*   (2006.01)

(52) U.S. Cl.
  CPC ..... *G06K 9/00671* (2013.01); *G06Q 30/0276* (2013.01); *G06T 11/00* (2013.01); *G06K 2209/01* (2013.01)

(58) Field of Classification Search
  None
  See application file for complete search history.

(56) References Cited

U.S. PATENT DOCUMENTS

| | | | |
|---|---|---|---|
| 10,019,136 B1* | 7/2018 | Ozog | H04N 21/44008 |
| 2012/0299961 A1 | 11/2012 | Ramkumar et al. | |
| 2013/0206830 A1* | 8/2013 | Kugel | G06Q 10/08 235/375 |
| 2013/0210523 A1* | 8/2013 | Arumugam | G07F 17/3218 463/31 |
| 2016/0209648 A1* | 7/2016 | Haddick | G06F 3/03547 |
| 2016/0328607 A1* | 11/2016 | Krishnan | G06K 9/3241 |

(Continued)

FOREIGN PATENT DOCUMENTS

WO   2013138846 A1   9/2013

OTHER PUBLICATIONS https://appleinsider.com/articles/20/07/23/apple-plans-to-dominate-all-aspects-of-ar-with-apple-glass-and-more.

(Continued)

*Primary Examiner* — YuJang Tswei
(74) *Attorney, Agent, or Firm* — Nixon & Vanderhye PC

(57) ABSTRACT

Systems, methods and techniques for automatically recognizing two or 3-dimensional real world objects with an augmented reality display device (smartphone or glasses etc.), and augmenting or enhancing the display of such real world objects by superimposing virtual images such as a still or video advertisement, an opportunity to buy, a story or other virtual image presentation. In non-limiting embodiments, the real world object includes visible features including visible security features and a recognition process takes the visible security features into account when recognizing the object and/or displaying superimposed virtual images.

19 Claims, 24 Drawing Sheets

(56) References Cited

U.S. PATENT DOCUMENTS

| | | | |
|---|---|---|---|
| 2017/0249491 A1* | 8/2017 | Macintosh | G06K 7/10861 |
| 2018/0089899 A1 | 3/2018 | Piemonte et al. | |
| 2018/0208209 A1 | 7/2018 | Al-Dahle et al. | |
| 2018/0330167 A1* | 11/2018 | Siggard | H04N 21/41407 |
| 2019/0124272 A1* | 4/2019 | O'Neill | H04N 5/72 |
| 2019/0318186 A1* | 10/2019 | Sergott | G02B 27/0176 |
| 2020/0089014 A1 | 3/2020 | Peng et al. | |
| 2020/0089313 A1 | 3/2020 | Himane | |
| 2020/0225901 A1 | 7/2020 | Boissiere et al. | |
| 2020/0233212 A1 | 7/2020 | Piemonte et al. | |
| 2020/0233220 A1 | 7/2020 | Strongwater et al. | |
| 2020/0233453 A1 | 7/2020 | Hatfield et al. | |
| 2020/0233681 A1 | 7/2020 | Garstenauer et al. | |

OTHER PUBLICATIONS

International Search Report (PCT/ISA/220 & PCT/ISA/210) and Written Opinion (PCT/ISA/237) issued in PCT Application No. PCT/IB2020/058386 dated Feb. 1, 2021 (19 pages).

\* cited by examiner

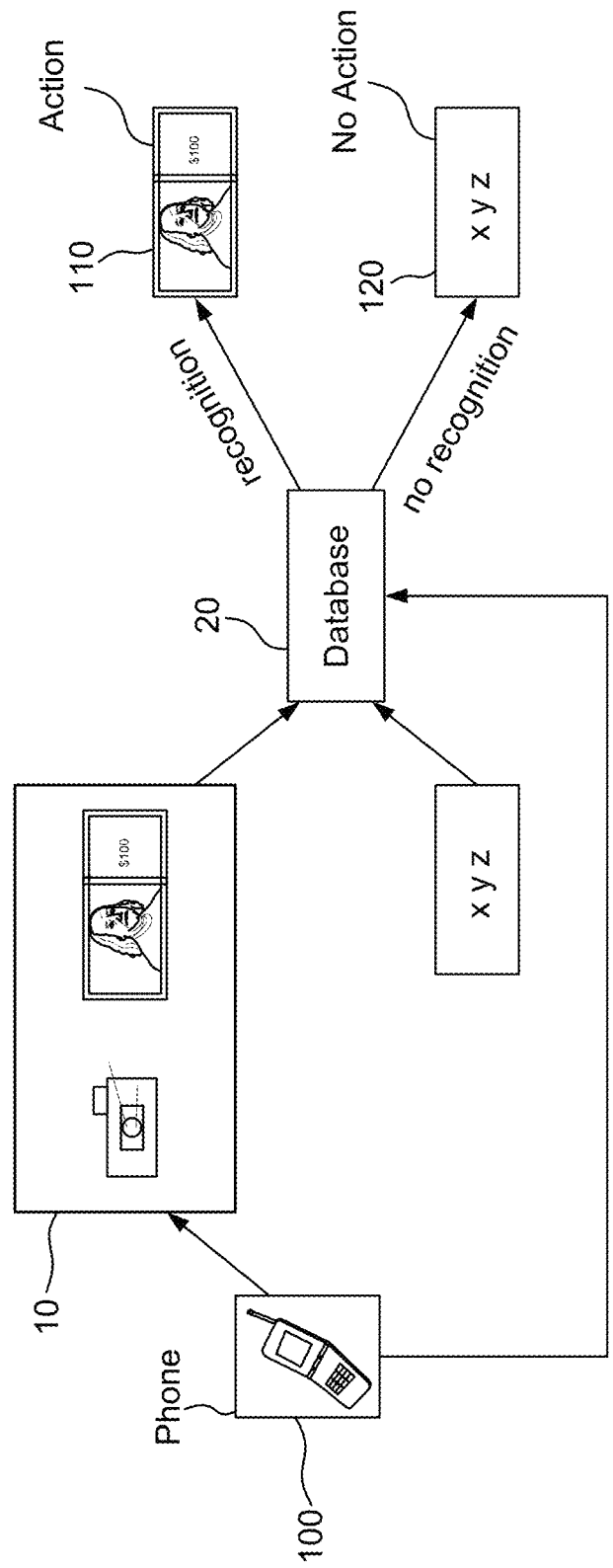

FIND GREAT AVIATION JOBS WITH EXCELLENT BENEFITS AT AAR

09 FEBRUARY 2017 PAT-SMITH AVIATION JOBS, JOB SEARCH, NEWSLETTER, SPECIAL EVENTS

LET YOUR CAREER TAKE FLIGHT

FIND GREAT AVIATION JOBS WITH EXCELLENT BENEFITS - AT AAR
APPLY TODAY.

AAR Aircraft Services, the largest independent MRO provider in North America, has immediate job openings and is conducting interviews for:
> A/P, S/M, R/E Technicians and Inspectors
> Lead A/P, S/M, R/E and Lead Inspectors
> Supervisory positions (3+ years of experience required)
> Project Manager positions (7+ years experience required)

The positions are located in:
> Rockford, IL
> Miami, FL
> Duluth, MN
> Indianapolis, IN
> Oklahoma City, OK

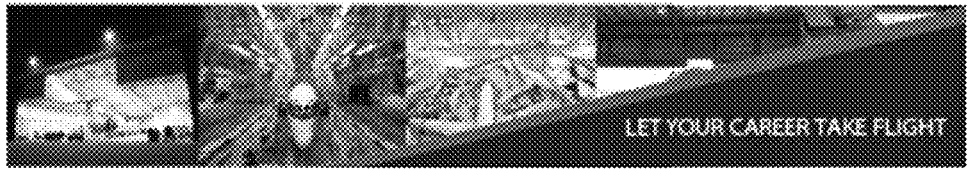

FIND GREAT AVIATION JOBS–WITH EXCELLENT BENEFITS–AT AAR

AAR Aircraft Services, the largest independent MRO provider in North America, has immediate job openings ar is conducting interviews! Apply Today.

Figure 12

AUGMENTED, VIRTUAL AND MIXED-REALITY CONTENT SELECTION AND DISPLAY

CROSS-REFERENCES TO RELATED APPLICATIONS

This is a continuation-in-part of U.S. patent application Ser. No. 16/565,234 filed Sep. 9, 2019, and claims benefit of U.S. Provisional Patent Application No. 62/966,503, filed Jan. 27, 2020, incorporated herein by reference.

STATEMENT REGARDING FEDERALLY SPONSORED RESEARCH OR DEVELOPMENT

None.

BACKGROUND & SUMMARY

Augmented reality ("AR") is the real-time superimposition of artificial images onto real world images. This technology has been used for a variety of applications from handheld entertainment to heads-up displays on military jets. For example, a person using an augmented reality-enabled display device (e.g., a smartphone with an AR app or AR enabled glasses) while shopping can be shown virtual advertisements, sale announcements, pricing information etc. superimposed onto images of actual products they can purchase.

BRIEF DESCRIPTION OF THE DRAWINGS

FIG. 1B shows an example branching process.
FIG. 7A shows an example capture of an image of a print advertisement on a smart device.
FIG. 8A shows an example image capture of a print advertisement.
FIG. 12 shows an example employment listing.

DETAILED DESCRIPTION OF EXAMPLE NON-LIMITING EMBODIMENTS

Figure 1A:
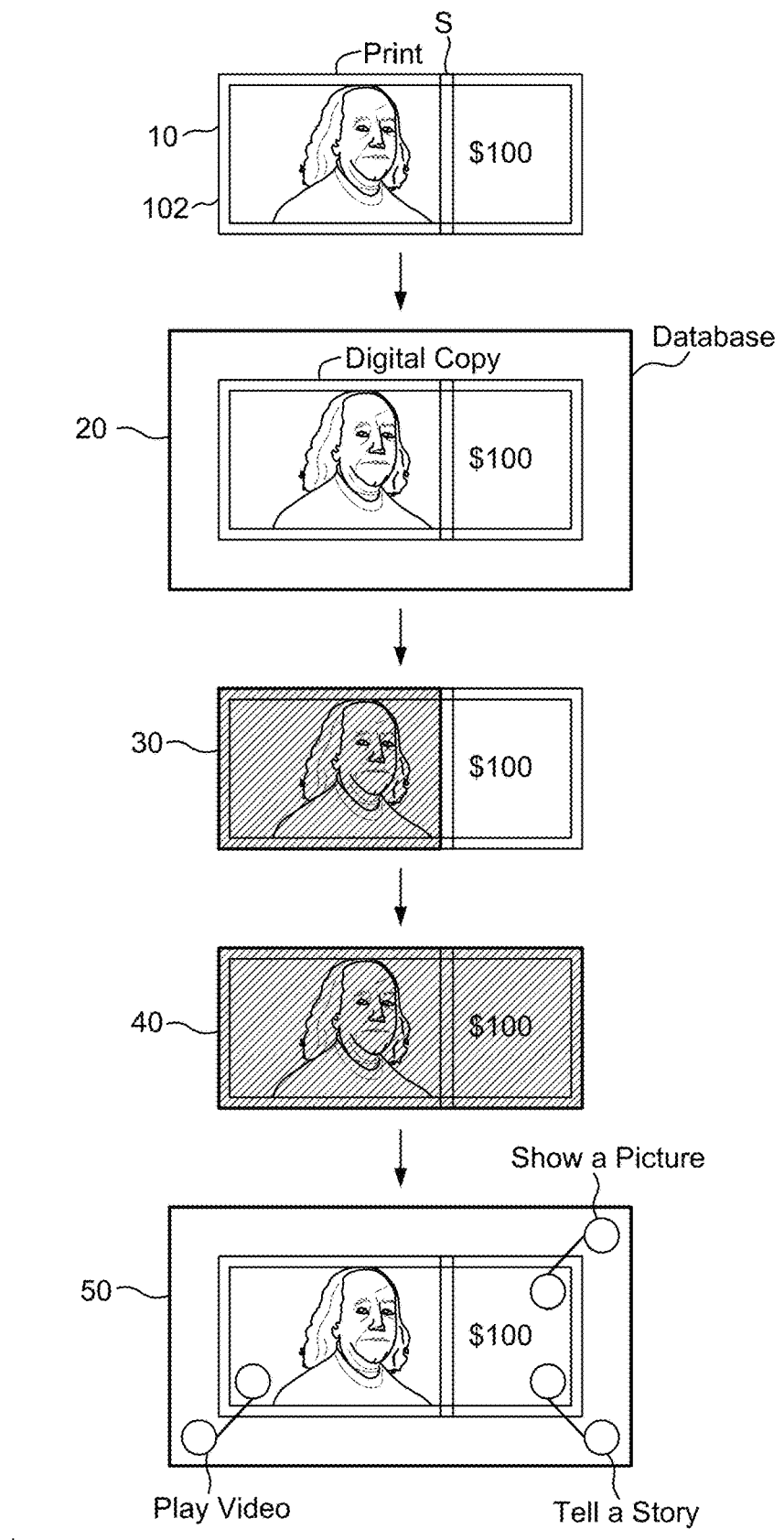
FIG. 1A is an example process flow diagram.

Because AR tends to drive higher levels of attention, one advantageous use of augmented reality is superimposing advertisements and/or purchasing information over product images. People who might ignore traditional electronic advertisements may pay attention to an AR advertisement. Same with traditional printed advertisements, which can be used as a trigger to superimpose a digital overlay which then opens up new options like adding videos, live streams, buying options or other information and content.

This technology provides systems, methods and techniques for automatically recognizing two- or three dimensional real world objects (3 dimensional with any kind of print eras example on the package of a product) with an augmented reality display device, and augmenting or enhancing the display of such real world objects by superimposing virtual images such as a still or video advertisement, a story, a tutorial, specific information, a shopping opportunity, or other virtual image presentation.

In non-limiting embodiments, the real world object includes visible features including visible security features and a recognition process takes the visible security features into account when recognizing the object and/or displaying superimposed virtual images.

In the near future, when AR becomes really popular with any kind of glasses or other viewing arrangement, we might also see at least a partial replacement of the smartphone. That means that we will see new use cases that use AR or mixed reality to provide users or customers with new information, any kind of content or buying options triggered by the recognition of a print that could be a 2 or 3 dimensional object. For example, if you see a job advertisement, with your AR glasses or a handheld device you can watch a related video or activate a call button to talk to somebody from HR of that company. When you see a travel advertisement, you point the camera or other viewing device on this and you can watch a video of the destination, a buy option or different dates etc. or talk to a travel agent. When you see an advertisement of a product, you can decide to watch a related video, get other product information or buy it. This same scenario can exist with a product or service manual that could be the trigger of specific information that will allow you to understand how a product works by giving you technical drawings etc. This same scenario could apply in the real estate market where you can see a video of the object, specific information such as the price or price history, the neighborhood, floorplan, a call button to call the agent etc. This same scenario could apply with tickets where there is a city light as a trigger and when the AR kicks in, you can buy this ticket for a concert, a sport event etc. It could be that specific information about that concert or event can be provided to motivate customers to purchase. That could be videos or other specific information about players, a track record, etc. In one example embodiment, a device enables or allows superimposition of a digital overlay that leads to specific action such as providing specific information; providing videos, tutorials, or any kind of content; providing options to buy; or other options.

FIG. 1A shows an example non-limiting process. At 10, a printed, engraved, stamped or other object 102 such as a banknote, coin or ID (see FIGS. 2A-2J) is scanned to produce a digital copy. Such scanning can be performed with a camera, a CMOS light sensor, a document scanner, or any other conventional device that creates a digital image of the printed object.

The printed object may include visible features such as distinctive images of persons, buildings, etc. In the example shown, the printed object further includes an example visible security feature S represented here as a vertical band. The scanned digital copy will include the distinctive image(s) as well as the visible security feature S.

At 20, the resulting digital copy of the printed object is uploaded into a database, and enhanced to provide a selected associated overlay comprising: (a) self-starting video(s) and/or video(s) that start when you physically press a button that has been programmed to show up on the surface of a device like a mobile phone, Ipad etc., or activate this activity by voice, movements of your head and/or gesture; (b) button(s) that when selected have different interactive functions such as "tell a story"; and (c) interactive connection to an online shopping experience e.g., to show a store finder (see 50). We can change the digital "overlay" quickly if needed (e.g., to change from one advertising campaign to another) or update content, price tags, videos or other information.

To activate that overlay, we determine an "area of recognition" as indicated by a cross-hatched area (30). In one example embodiment, the area of recognition is determined at least in part by the presence, position, dimensions and/or orientation of one or more security features S. For example, the area of recognition may be defined to exclude the security feature S on the printed object. As an example, in the case of a 20 Euro note (see FIG. 2E) including a vertically-oriented silver holographic band which appears differently depending on the viewing angle, the "area of recognition" may defined to exclude the silver holographic band so the system is able to recognize the object even without a silver line. Similarly, the area of recognition in the case of a $100 US banknote shown in FIG. 2C may be defined to exclude security features B, C and E since at least some of these features may appear differently depending on viewing angle (e.g., the ink color changes from gold to green as viewing angle changes). Other security features such as serial numbers, bar codes etc. vary from one printed document to another, so that using such indicia will result in no recognition of a banknote of the same denomination but having a different unique serial number and/or unique bar code (i.e., the purpose of the recognition may be to recognize a particular kind of banknote, not that specific one-of-a-kind banknote). Excluding such security features from the area of recognition makes recognition more robust because it is not subject to such constraints.

The recognition of a specific area then triggers a digital overlay that includes defined features (video, information, content, shopping, etc.) that show up and can be used by a person to get information, see a video, shop etc.

Figure 1C:
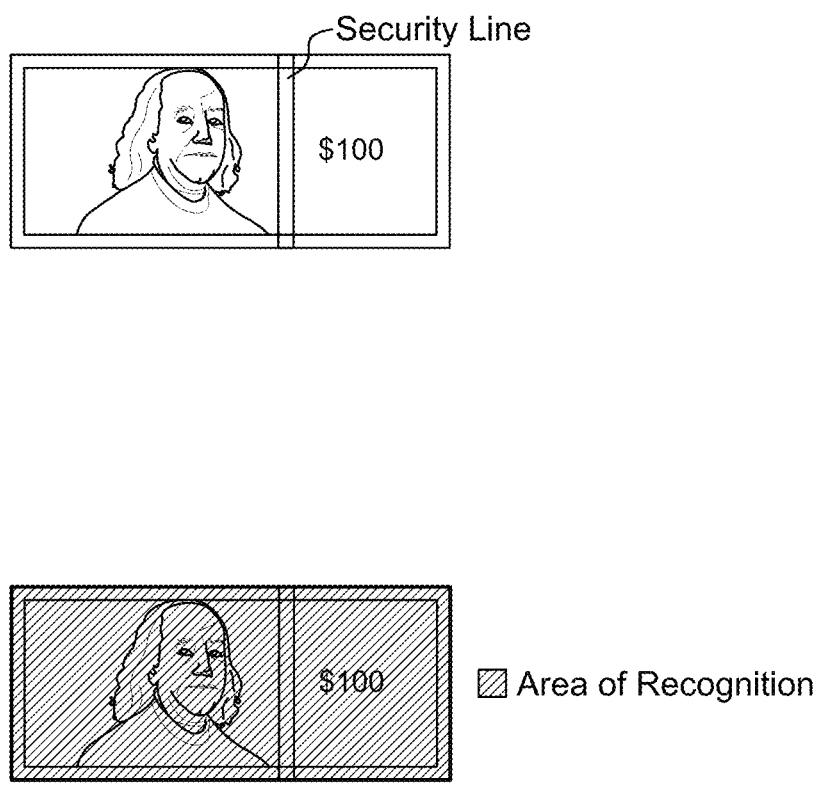
FIG. 1C shows an example area of recognition.
Figure 2A:
FIGS. 2A-2J show example items to be recognized.
Figure 2B:
Figure 2C:
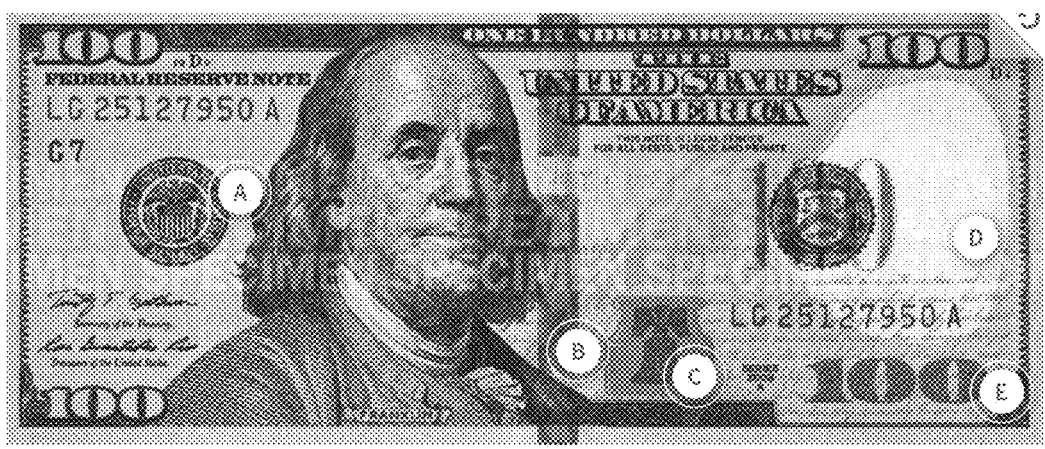
Figure 2D:
Figure 2E:
Figure 2F:
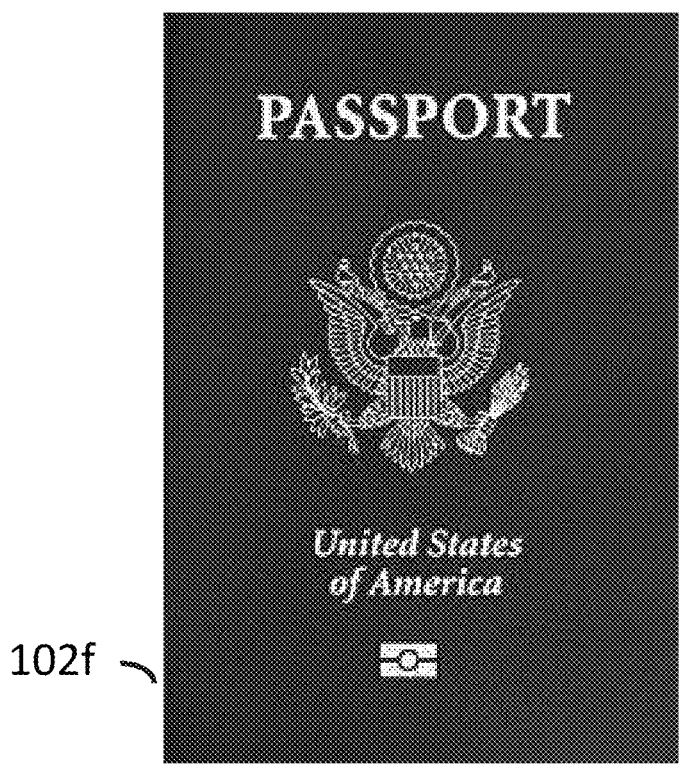
Figure 2G:
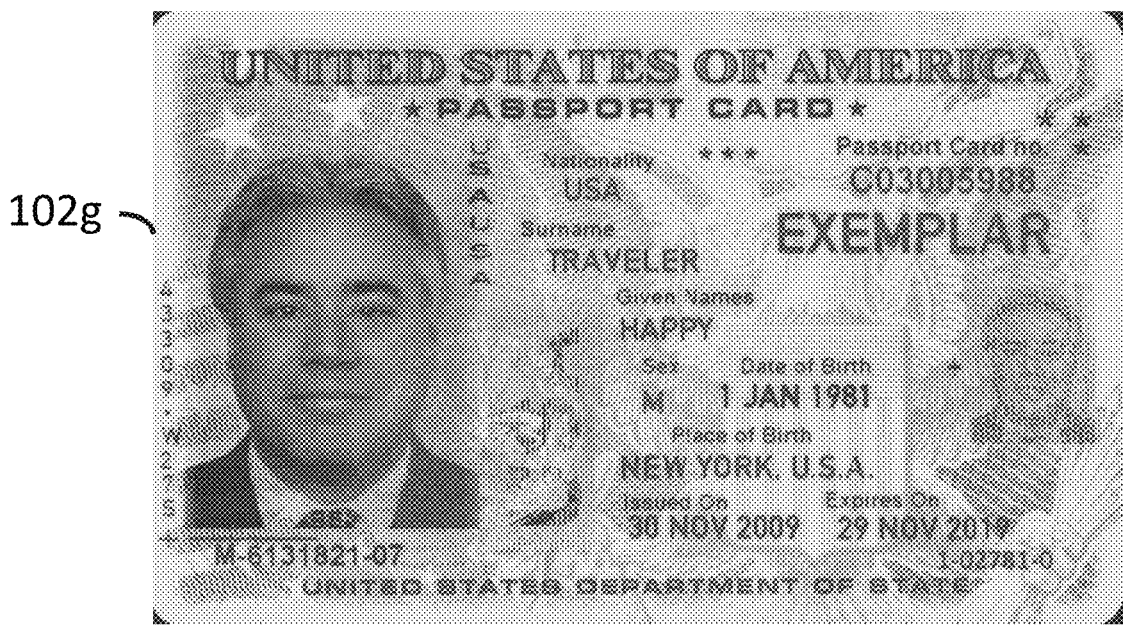
Figure 2H:
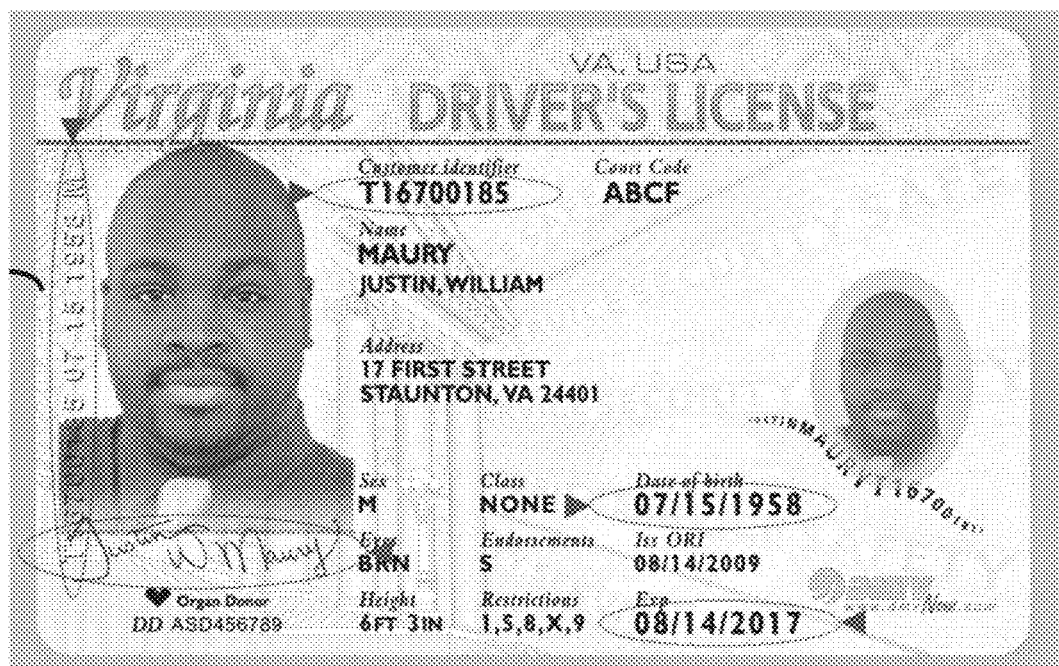
Figure 2I:
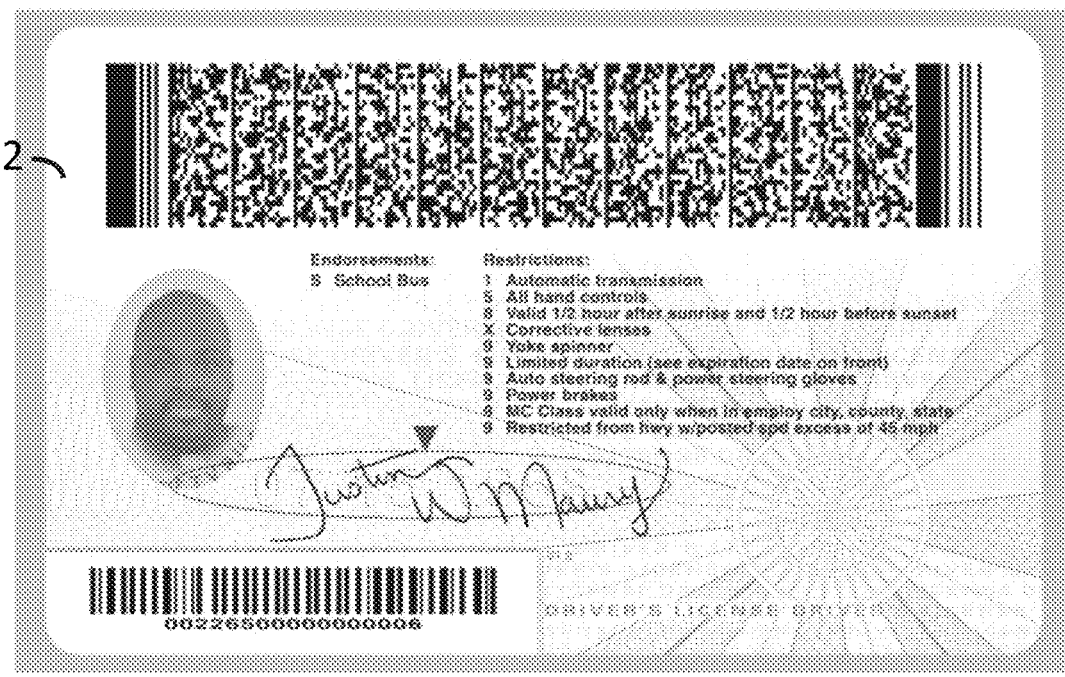
Figure 2J:

In another embodiment at 40, at least some security features S are included in the defined area of recognition. The object is recognized only if it includes the security feature(s). If there are visible security features, we can include them into our recognition program. When we upload the digital copy of a print, we can decide which area of the print is used for recognition. See FIG. 1C. When this area of recognition includes an example such as the silver line of a banknote, the note cannot be recognized when the silver line is missing. In this embodiment, the security feature S is used as a feature of recognition to increase the reliability of the recognition to recognize distinctive documents, while designing the recognition algorithm to take different viewing angles into account. For example, it is possible to include the position and orientation of a silver holographic band in an area of recognition without requiring the holographic contents of the band to be recognized. Similarly, it is possible to include the position of serial numbers or bar codes in an area of recognition without requiring the specific serial numbers or bar code contents to match.

Some embodiments provide plural overlapping areas of recognition for the same object; one area of recognition may exclude certain security features and another area of recognition includes those security features. The plural different overlapping areas of recognition can be applied sequentially or simultaneously to increase recognition reliability. A voting algorithm can be used to select positive matches.

In example non-limiting embodiments, the database enables real time recognition of an image captured by a user. For example, if the user captures an image of a 20 Euro note, a matching algorithm is used to determine a positive match if the database contains a digital copy of a 20 Euro note. In example non-limiting embodiments, the matching algorithm can include pattern recognition techniques such as described in Conti et al, Multiresolution image registration, Proceedings, International Conference on Image Processing (IEEE 23-26 Oct. 1995); Hasanuzzaman et al, Robust and effective component-based banknote recognition by SURF features, 20th Annual Wireless and Optical Communications Conference (IEEE 15-16 Apr. 2011); Doush et al, Currency recognition using a smartphone: Comparison between color SIFT and gray scale SIFT algorithms, Journal of King Saud University—Computer and Information Sciences Volume 29, Issue 4, October 2017, Pages 484-492.

As will be understood by those skilled in the art, the database 20 could but need not contain the captured images themselves. For example, in some embodiments, the database might contain compressed or other feature sets used for comparing with captured photos, such feature sets for example comprising a listing of coordinates and associated image features to thereby reduce storage requirements and increase recognition speed. Similarly, when a smart device captures an image, instead of uploading the entire image it may analyze the image and upload a compressed format such as coordinates of pattern features. Since the purpose of recognition in the example non-limiting embodiment is not to determine whether the banknote or other printed item is authentic and genuine, the matching/recognition standards can be significantly relaxed and thus quite different as compared to conventional banknote scanners/recognizers.

Some example embodiments use artificial intelligence and machine learning to perform the matching. The training set consists of images captured by various smartphones and other user devices. Other embodiments use simpler pattern recognition algorithms based on color and/or grey scale information in the area(s) of recognition. Any given object can have at least one and as many as N different discrete areas of recognition, where N is a positive integer.

Figure 3:
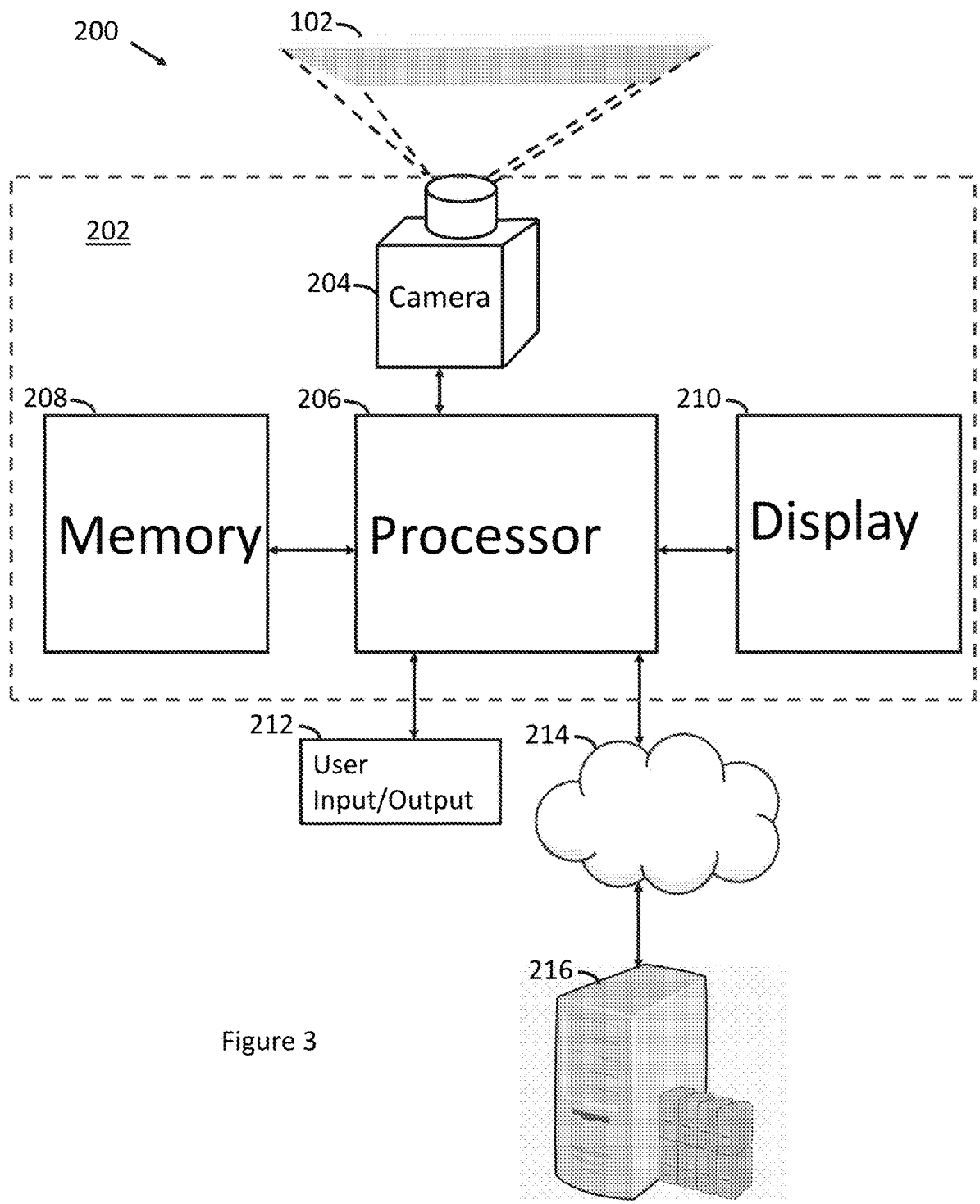
FIG. 3 shows an example block diagram of a smart device and associated system.

FIG. 3 shows an example non-limiting system 200 including a user device such as a smartphone 202, AR glasses, etc. which includes a camera or CMOS sensor 204, a processor 206, a memory 208, a display 210 and user input/output devices 212 such as a touch screen, push buttons, etc. The processor 206 communicates wirelessly or through a wire via a network 214 with a server 216 which may store the database 20 and in some embodiments perform the image recognition. The app may comprise executable instructions that the device 202 downloads from the server 216, stores in memory 206, and executes in response to user selection of input/output devices 212.

Figure 4:
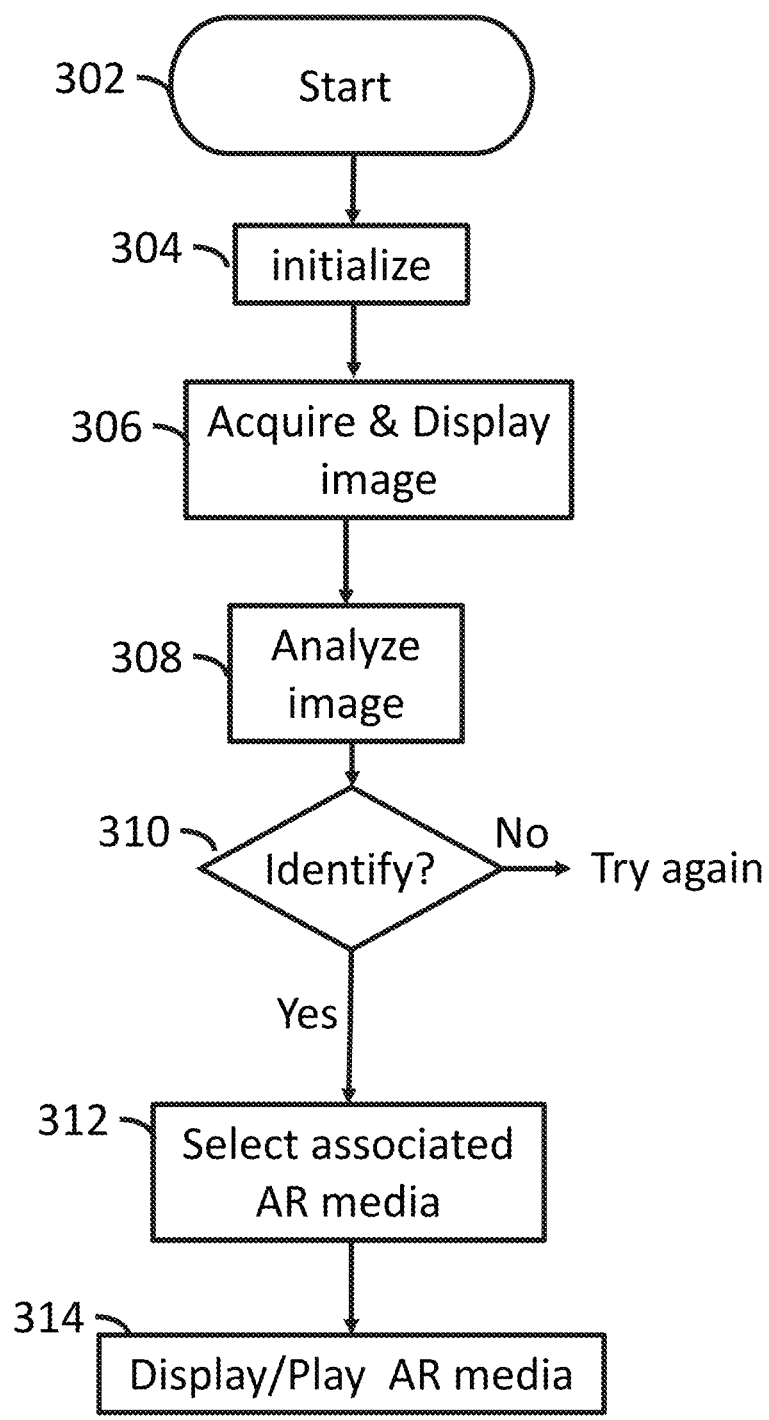
FIG. 4 shows an example non-limiting process flow diagram.

From a user perspective, as shown in FIG. 1A, after downloading an app onto their smart phone, smart glasses or other portable or non-portable device 202, the customer can point the device's camera onto a print, physical object or a digital copy on the screen of his tablet, computer, etc. (100; FIG. 4 blocks 302, 304, 306). This can be the camera of a device like an Iphone or an external camera or a camera that is a part of AR glasses. This causes the device 202 to display a photographically captured image on display 210 (see FIG. 5A, 6A). It is possible in some embodiments for device 202 to obtain this captured image some other way than photographing an actual object 102, such as via network 214, e.g., by downloading the image through Instagram or other photo sharing service, by receiving the image via a text (SMS) message, by receiving the image from another device in proximity (e.g., using Bluetooth pairing, etc.) or by other means.

Once the app has been activated to recognize the captured image, the app connects with the database 20 on server 216 via network 214 and checks if this print is recognized (FIG. 4 blocks 308, 310). If recognition is successful (branch 110), an action is enabled (e.g., playing a video, telling a story and/or showing a picture, showing shoplinks or other information) (FIG. 4, blocks 312, 314). If recognition is unsuccessful (branch to 120), no action is enabled or a different action ("xyz") may be performed instead.

In one non-limiting example, the app causes the smartphone or other device 202 to show a picture or video by anchoring it to the image currently being captured by the device's camera 204 and displayed on the device's display 210. See FIG. 5B, 6B. If the user moves the device slightly to change the position or orientation of the printed item on the device's's display 210, the picture or video will move with the image of the printed item on the display as if it were glued or otherwise adhered to the printed item or were being displayed by the printed item itself from a magic display window on the printed item. For example, the superimposed image can change position, orientation and/or perspective as the underlying real world object changes position, orientation and/or viewing angle in order to provide a photorealistic image in which the superimposed image appear to be part of the underlying real world image. See for example FIG. 6B. This augmented reality feature provides a sense of wonder or surprise that is designed to capture the attention of the user. Instead of appearing to be a "flat" advertisement, the picture or window appears to be much more interactive and interesting and thus captures the user's attention. The augmented reality image can be animated and can be accompanied by audio and/or tactile sensations as indicated in FIGS. 5A, 5B, 6A, 6B.

In other embodiments, so-called "mixed reality" or "virtual reality" can be used instead of or in addition to augmented reality. Generally speaking, "virtual reality" presents the user with an image of an entirely virtual/non-real world. The posture (orientation and/or position) of the device may be sensed (e.g., using inertial sensors such as accelerometers and/or gyrosensors; magnetic position and/or orientation sensors; RF beacon sensors; optical sensors providing an optical "flow" image analysis; and other known conventional technologies. Different portions of the virtual world may be displayed based on such sensed posture.

Other embodiments can use so-called "mixed reality" (MR) that mixes virtual and real scenes. Such an MR experience is one where the user is placed in an interactive setting that is either real with virtual asset augmentation (augmented reality), or virtual with real-world augmentation. See Ohta et al, Mixed Reality: Merging Real and Virtual Worlds (Springer Publishing 2014); Milgram et al, A Taxonomy of Mixed Reality Visual Displays, IEICE TRANSACTIONS on Information and Systems Vol. E77-D No. 12 pp. 1321-1329 (1994/12/25); Hughes et al, Mixed reality in education, entertainment, and training, IEEE Computer Graphics and Applications (Volume: 25, Issue: 6, November-December 2005).

In more detail, a user can aim the camera of a smartphone, smart glasses or other electronic device at any two-dimensional or three-dimensional real world object or a likeness of such an object. One example type of a two-dimensional object could be a portable, wallet-sized planar object such as a banknote, driver's license, passport, printed advertisement, real estate advertisement or other official or unofficial identification document examples of which are shown in FIG. 2A-2I. Other examples of such objects might include for example a real estate advertisement, a human resources want ad, and objects related to a shopping experience. Using the technology with AR Glasses instead of a mobile phone means, that you do not touch a button of the superimposed digital image on your screen but press either a virtual button to shop or get information or just say that you want to press a specific button or say that you want to see a video or say that you want to buy a merchandise that is offered within the digital overlay, For example, the object as shown in FIG. 7 may comprise a real estate advertisement which can show one or several houses, lots, commercial buildings, private properties etc. An example area of recognition may constitute a single advertisement or a portion of an advertisement (see FIG. 8). Image recognition may be used to recognize the particular real estate property, and such recognition may be used to select and initiate display of a media item that provides more images and information concerning that property.

These information can be floor plans, videos of the property, contact data of the agent, the lot size, drone videos, the actual price tag or any other information that ate relevant for the seller, the buyer or the agent.

The same with any shopping or travel advertisements where you define an area of recognition which could be a part or parts of that advertisement or even the full page to trigger a superimposed image that contains videos, shoplinks or other buttons that provide other content or information and allow to buy merchandise, travel related services (flight, hotel, tour, cruise, travel package, insurance and/or watch, read related information.

Another example for a use case is related to packaging, where you define an area of recognition on a 3 dimensional object. After a match in the database you can add product information, videos, or any other content or buy the specific merchandise.

As another example, the object shown in FIG. 9 is an employment advertisement. Image recognition processes may be used to recognize the advertisement. Successful recognition can be used to select and cause display of a media item that provides more information and images concerning the employment opportunity. For example, there is a strong use case where you point the camera on a standard HR advertisement and then you see, for example, the CEO or the HR Manager of the company describing that specific job.

As yet another example, the object may comprise the face, head or body of a person or animal Image recognition processes may be used to recognize the person or animal Successful recognition can be used to select and cause display of a media item that provides more information and images concerning the recognized person or animal.

Yet another example uses an object comprising a shopping item such as a particular product or service offering. Image recognition processes may be used to recognize the product or service offering. Successful recognition can be used to select and cause display of a media item that provides more information and images concerning the recognized product or service offering, or buying options In one example, such objects may be made of paper, plastic and/or other materials, and may be rigid, flexible and/or foldable. They may be of standard sizes such as 2.61 inches wide and 6.14 inches long; 120 by 62 millimetres (4.7 in×2.4 in) to 160 by 82 millimetres (6.3 in×3.2 in); the ID-1 format size of 85.60×53.98 mm (3⅜ in×2⅛ in approx.) and rounded corners with a radius of 2.88-3.48 mm (about ⅛ in); ID-3 standard size of 125×88 mm (4.921×3.465 in); or other size. See for example ISO/IEC 7810:2003. The object may be two-dimensional or three-dimensional.

One example such object comprises a banknote such as a US dollar bill, US five dollar bill, US ten dollar bill, US twenty dollar bill (see FIG. 2A), US fifty dollar bill (see FIG. 2B), a US one-hundred dollar bill (see FIG. 2C), a 20 euro note (see FIG. 2D), a 50 euro note (see FIG. 2E), or any other currency banknote. Other example objects comprise official government-issued identification such as a government issued passport (see FIG. 2F), passport card (see FIG. 2G), driver's license (see FIG. 2H, 2I), coin (FIG. 2J) or other official or unofficial object.

Such two-dimensional objects as described above often are protected by any or all of the following visible security features:
  holograms such as portrait window(s)
  woven three-dimensional security ribbon(s)
  distinctive image pattern(s) such as the EURion constellation
  glossy stripe(s) that reveal additional information when viewed on an angle
  watermark(s)
  raised printing
  ultraviolet ink (which reveals additional image information when viewed under ultraviolet light)
  thermochromatic ink (the color of which is dependent on temperature)
  color changing or color shifting ink (the color changes depending on viewing angle)
  see through indicia with complementary front and obverse portions
  microprinting (high resolution printing)
  unique printing fonts
  embedded security threads
  perforations
  plastic, cotton fiber or other material matted or other textured surface(s)
  barcodes
  serial numbers
  foil stamps
  photographs including clear window photographs
  unique metal compositions (for coins) such as bi-coloration
  other.

Example non-limiting recognition processes as described above can exclude such security features, or may take them into account or use them as part of the recognition process. However, since the purpose of the recognition is not to authenticate the photographed item as being genuine, the recognition/matching algorithm is quite different from ones that are used for banknote or ID authentication. In example non-limiting embodiments for example, it is desirable that matching occurs based on photographing a copy (e.g., displayed on a tablet screen or the like) and not just an original of a banknote, ID or the like. Thus, the matching will achieve positive results based on counterfeit (inauthentic) banknotes or IDs. However, the matching/recognition is robust in being able to detect different banknote denominations (e.g., 10 euro note versus 20 euro note versus $100 US bill etc.) and thus provide different overlays depending on which banknote is recognized.

In still other embodiments, the two-dimensional or three-dimensional object could comprise a political campaign poster, billboard, flyer package, floor stand, table stand, pen with advertisement or other printed material or 3 dimensional object with print and the overlay could provide a campaign song, slogan, speech, story, video or other content. Other types of campaigns could include advertising campaigns, company logos and printed advertising or any other printed campaign from companies or other entities.

As discussed above, other embodiments can employ a two-dimensional object comprising a real estate advertisement, a job advertisement, a product advertisement, a service advertisement, or any other presentation of an item, entity or organization that a user may wish to obtain more information concerning.

In example embodiments herein, the two-dimensional object is not (and does not need to contain) a so-called "AR marker" or 2D bar code and is otherwise not specially designed or intended to be recognized by an augmented reality display device.

Example 1

Figure 5A:
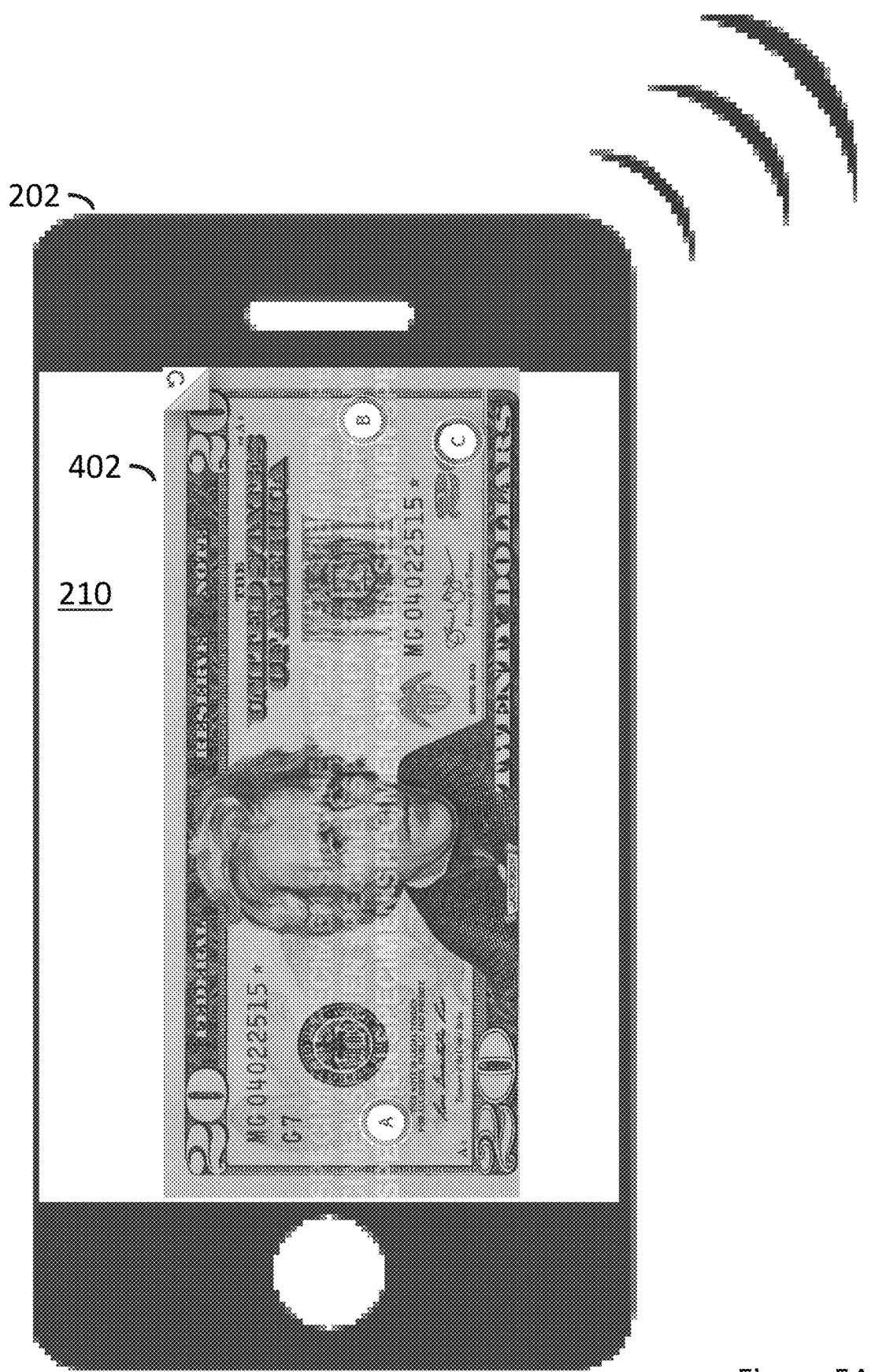
FIGS. 5A and 5B show an example augmented reality image superimposing a virtual image onto image captures.
Figure 5B:
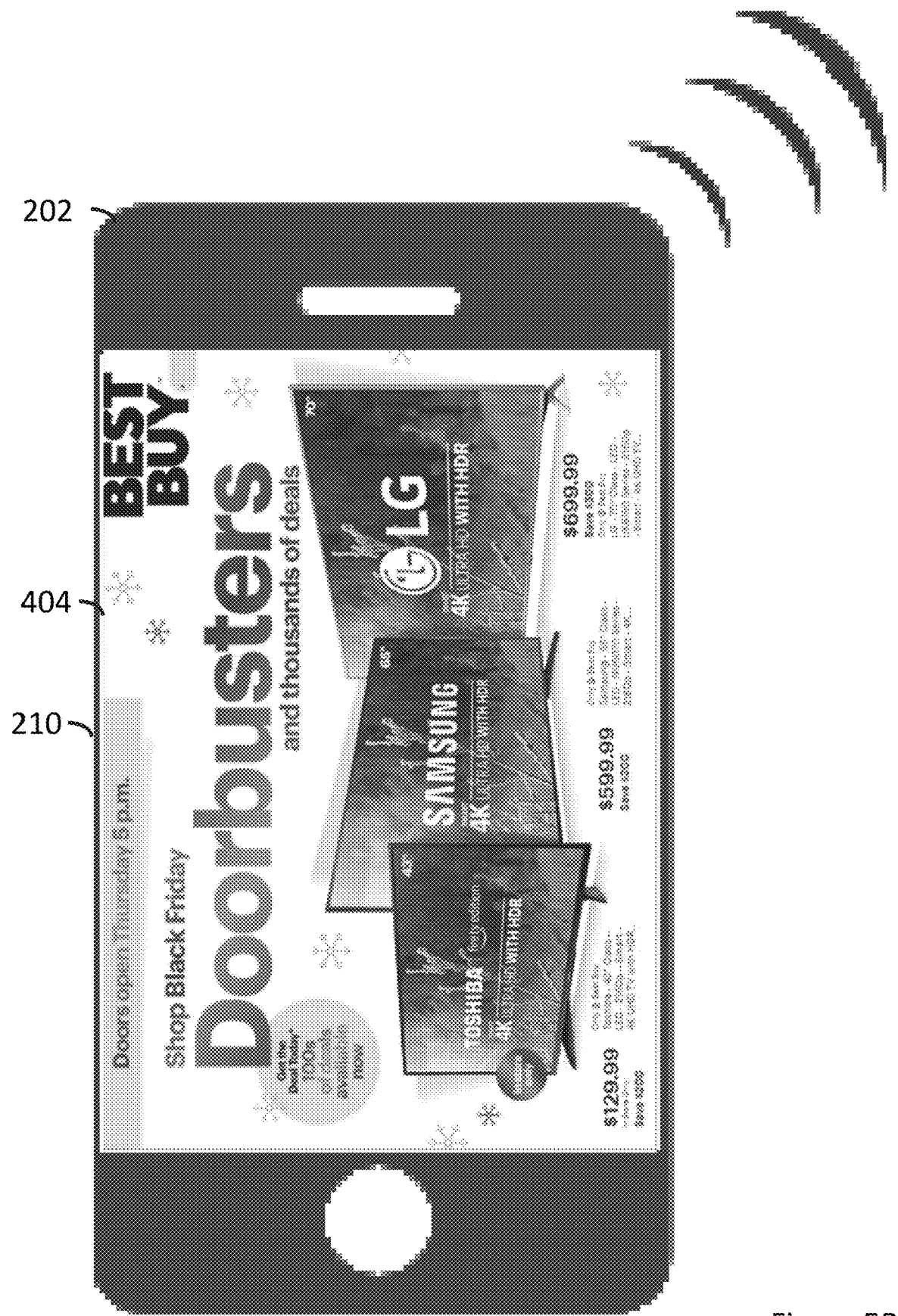

FIG. 5A shows a smart device 202 the camera of which has captured an image of a $20 bill. Once the app recognizes the captured image 402 as described above, it displays a corresponding advertisement 404 as shown in FIG. 5B. The advertisement may be superimposed over the captured image 402.

Example 2

Figure 6A:
FIGS. 6A and 6B show an example augmented reality image superimposing a virtual image (a video) onto an image capture of the front cover of a US passport.
Figure 6B:
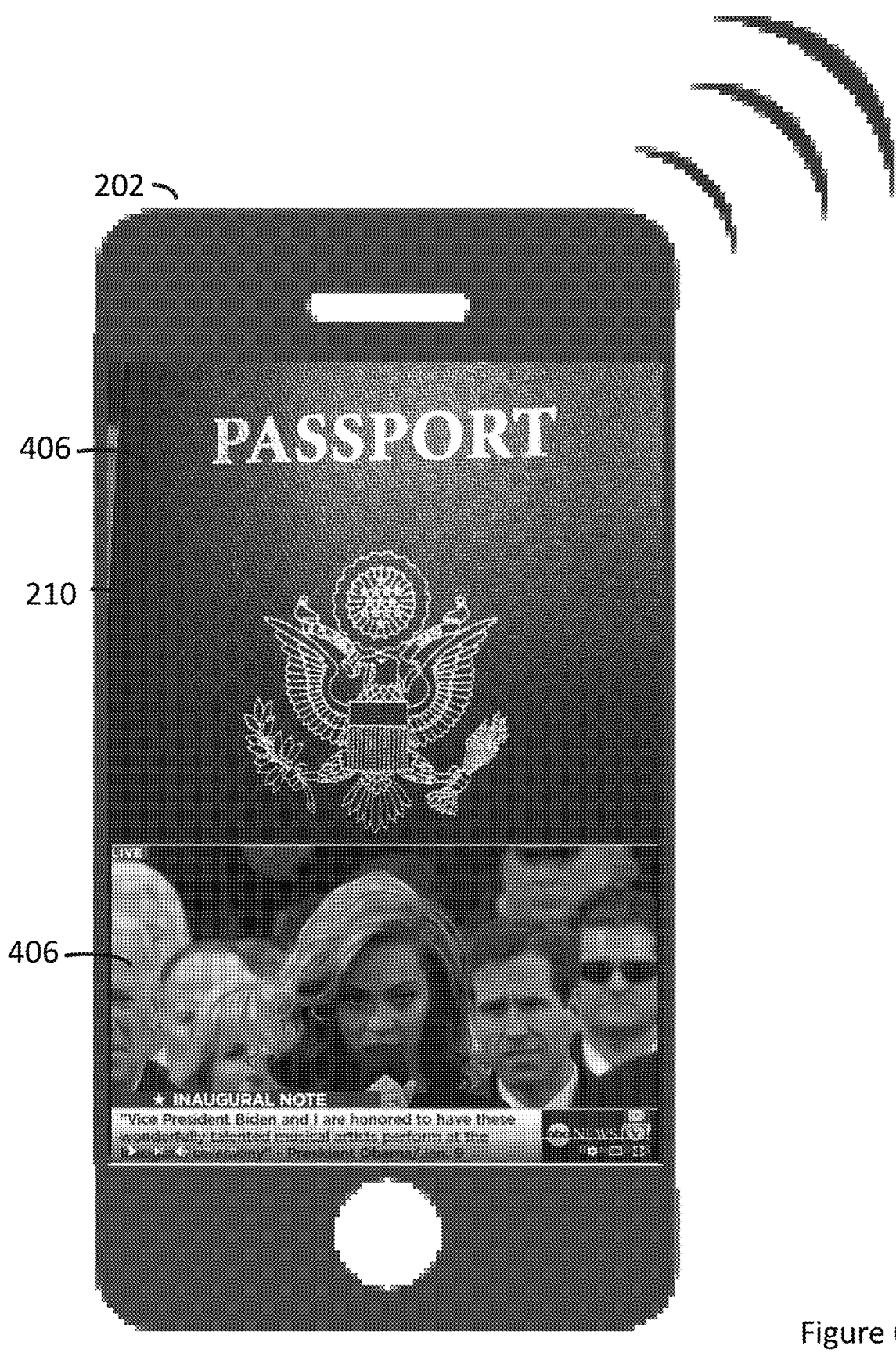

FIG. 6A shows a smart device 202 the camera of which has captured an image of a US passport. Once the app recognizes the captured image 406 as described above, it displays a corresponding video 408 (as shown in FIG. 6B) that is superimposed onto the captured image 406. If the user rotates the smart device 202 to change the position and/or orientation of the captured image 406, the corresponding video 408 will also change its position and/or orientation by the same amount. In some embodiments, the video 408 may be displayed with controls such as play/stop, fast-forward, rewind and mute that the user can press on the touch screen display 210 to allow the user to control playback of the video and/or accompanying audio.

Example 3

Instead of a video, FIG. 6B could display a superimposed control bar that allows the user to play an audio story associated with the captured image 406.

Example 4

Figure 7B:
FIG. 7B shows an example area of recognition of the FIG. 7A image capture.
Figure 7C:
FIG. 7C shows an example augmented reality image including superimposed virtual images (e.g., virtual shopping carts) onto the FIG. 7B image capture.

FIG. 7A shows a captured image of a print advertisement. FIG. 7B shows an example area of recognition. FIG. 7C shows a superimposed virtual image (shopping carts) on the FIG. 7A captured image to provide a virtual or mixed reality composite image.

Example 5

Figure 9A:
FIG. 9A shows an example area of recognition of the FIG. 8A image capture.
Figure 9B:
FIG. 9B shows an example augmented reality image superimposing virtual images (virtual shopping carts) onto the FIG. 8A image capture.

FIG. 8A shows an example of a captured image of a print advertisement. FIG. 9A shows an example area of recognition. FIG. 9B shows a superimposed virtual image (a shopping cart) on the FIG. 8A captured image to provide a virtual or mixed reality composite image.

Example 6

Figure 10A:
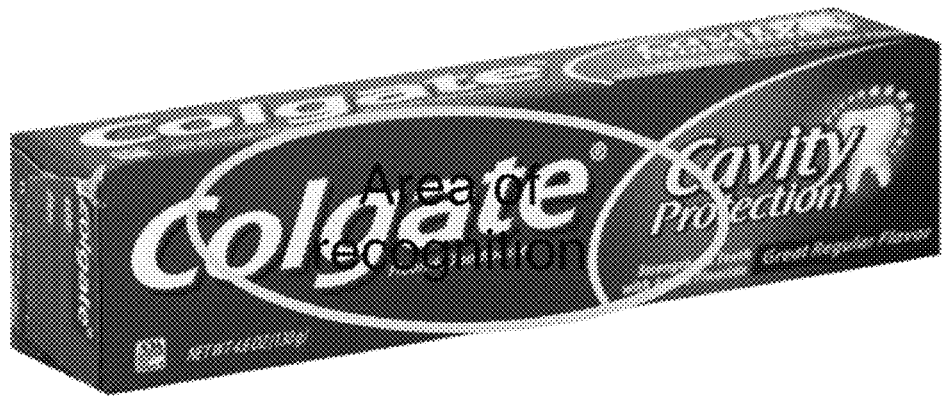
FIG. 10A shows an example image capture of a product trade dress including an area of recognition.
Figure 10B:
FIG. 10B shows an example augmented reality image superimposing a virtual image (e.g., a video of ingredients) onto the image capture of the FIG. 10A product trade dress.

FIG. 10A shows a captured image of a product package with a defined area of recognition. FIG. 10B shows a superimposed virtual or mixed reality composite image providing a video of ingredients.

Example 7

Figure 11A:
FIG. 11A shows an example image capture of a real estate print advertisement including an area of recognition.
Figure 11B:
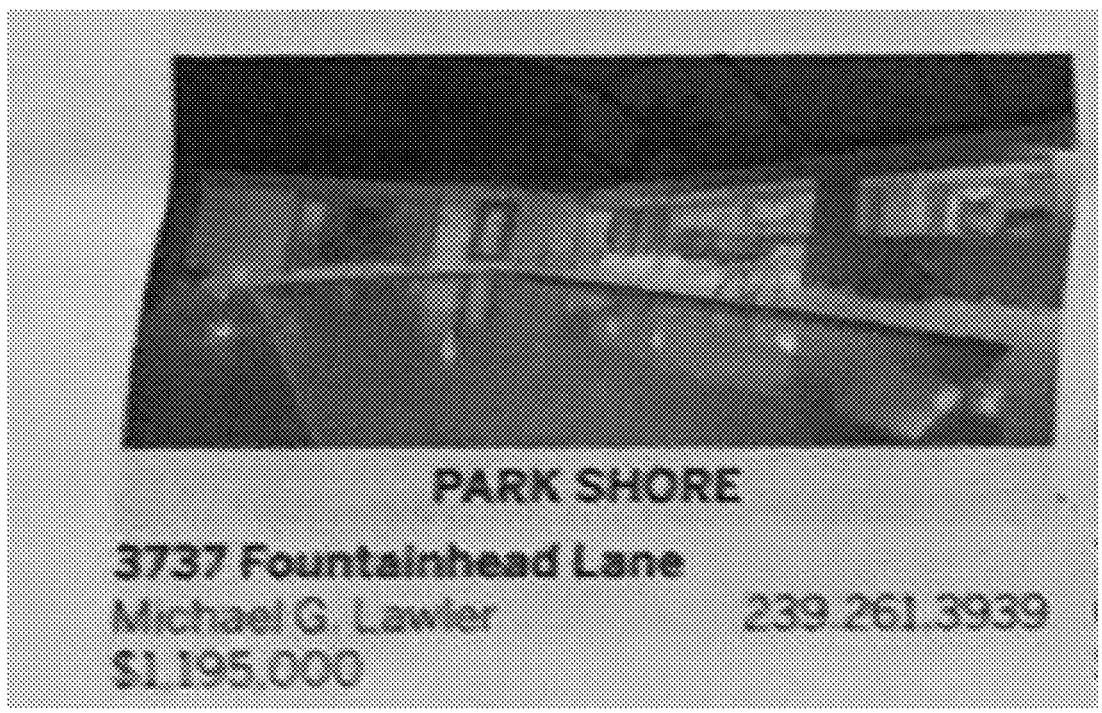
FIG. 11B shows a closeup view of the FIG. 11A area of recognition.
Figure 11C:
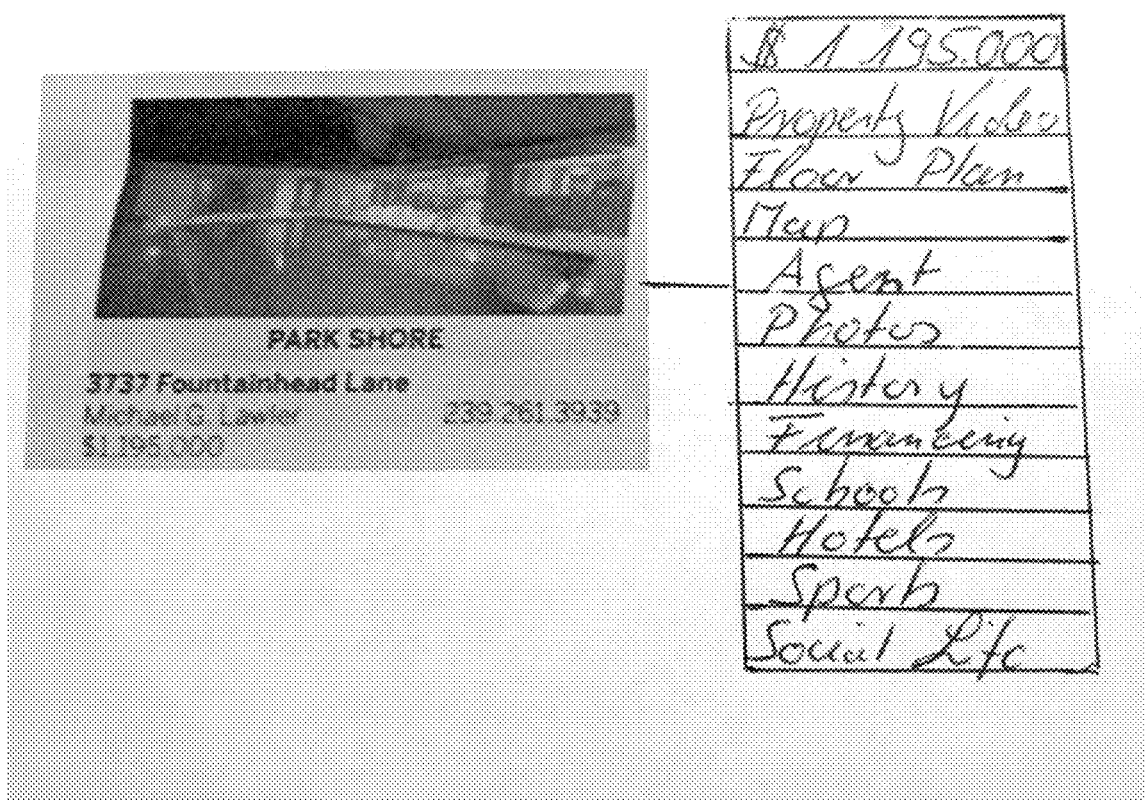
FIG. 11C shows an example augmented reality image superimposing a virtual image (e.g., a listing of additional information concerning the property) onto the image capture of FIG. 11A.

FIG. 11A shows a captured image of a print advertisement for real estate listings. FIG. 11B shows a closeup of an area of recognition. FIG. 11C shows a superimposed virtual image on the FIG. 11B captured image.

FIG. 12 shows an example captured image of a human resources advertisement. This captured image can have an area of recognition and can have a digital image superimposed thereon to provide an augmented or mixed reality image on a smart device such as a smartphone, smart glasses, etc. In some embodiments, the display process may comprise projecting the digital overlay directly or indirectly onto a user's retina. Such techniques would allow the user to view the digital overlay on a screen (e.g., smartphone) and/or on glasses that are used as a screen and/or independently of any screen viewing (i.e., the user could simply view the real world and the digital overlay would become part of their field of view based on such projection directly onto their retina).

All printed publications cited above (including the ones shown in FIGS. 2A-2J) are hereby incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of presenting image information to a user of a portable device having a portable camera and a portable display, comprising:
   enabling capture by the portable camera of images of a printed object having indicia printed thereon, wherein the portable camera is freely movable relative to the printed object so captured images of the printed object change in position and/or orientation;
   using an area of recognition that is defined to exclude at least one indicium on the captured images of the printed object, recognizing a pattern associated with the printed object from the captured images based on color and/or grey scale information in the area of recognition;
   selecting a media item in response to the recognized pattern; and
   superimposing the selected media item onto the captured image or an image derived therefrom displayed on the portable display, including moving the superimposed selected media item in response to changing position and/or orientation of the captured images of the printed object.

2. The method of claim 1 wherein the superimposing comprises using at least one of augmented reality, mixed reality and virtual reality.

3. The method of claim 1 wherein the recognizing comprises recognizing a two-dimensional or three-dimensional printed object with print on it.

4. The method of claim 1 wherein the recognizing includes recognizing characters printed on the object.

5. The method of claim 4 wherein the object comprises a printed advertisement.

6. The method of claim 5 wherein the selected media item comprises a digital overlay that leads to specific action selected from the group consisting of providing specific information; a video, tutorial, or any kind of displayable content; or an option to buy.

7. The method of claim 1 wherein the superimposing is performed on a handheld display device or smart glasses.

8. The method of claim 1 wherein the printed object comprises a product or service manual and the method further includes triggering of specific information that will allow a user to understand how a product works by providing technical drawings.

9. The method of claim 1 wherein the selected media item comprises a call button.

10. A method of providing a message to a user of a portable device having a portable camera and a portable display, comprising:
    using the portable camera to capture images of a billboard, package, object with print on a surface thereof, flyer or other printed representation, wherein the portable camera is freely movable relative to the billboard, package, object with print on its surface, flyer or other printed representation so captured images of the billboard, package, object with print on its surface, flyer or other printed representation change in position and/or orientation;
    displaying the captured images of the billboard, package, object with print on its surface, flyer or other printed representation on the portable display;
    using an area of recognition defined to exclude at least one indicium within the captured images, recognizing the billboard, package, object with print on its surface, flyer, or other printed representation based on grey scale and/or color values within the area of recognition; and
    providing on the display an augmented reality, virtual reality or mixed reality overlay on the displayed image, the overlay providing an adjunct message associated with content of the billboard, package, object with print on its surface, flyer or other printed representation, including moving the overlay on the display in response to changing position and/or orientation of the captured images of the billboard, package, object with print on its surface, flyer, or other printed representation to simulate the overlay adhering to the billboard, package, object with print on its surface, flyer, or other printed representation or being displayed from a display window on the billboard, package, object with print on its surface, flyer, or other printed representation.

11. A system for presenting image information to a user of a portable device having a portable camera and a portable display, comprising:
- a portable camera that is freely movable relative to a printed object having indicia printed thereon so images of the printed object captured by the portable camera change in position and/or orientation,
- a portable display, and
- a processor in communication with the portable camera and the portable display, the processor being configured to perform operations including:
  - enabling capture by the portable camera of images of the printed object;
  - using an area of recognition that is defined to exclude at least one indicium on the captured images of the printed object, recognizing a pattern associated with the printed object from the captured images based on color and/or grey scale information in the area of recognition;
  - selecting a media item in response to the recognized pattern; and
  - superimposing the selected media item onto the captured image or an image derived therefrom displayed on the portable display, including moving the superimposed selected media item in response to changing position and/or orientation of the captured images of the printed object.

12. The system of claim 11 wherein the superimposing comprises using at least one of augmented reality, mixed reality and virtual reality.

13. The system of claim 11 wherein recognizing comprises recognizing a two-dimensional or three-dimensional printed object with print on it.

14. The system of claim 11 wherein recognizing includes recognizing characters printed on the object.

15. The system of claim 14 wherein the object comprises a printed advertisement.

16. The system of claim 11 wherein the selected media item comprises a digital overlay that leads to specific action selected from the group consisting of providing specific information; a video, tutorial, or any kind of displayable content; or an option to buy.

17. The system of claim 11 wherein superimposing is performed on a handheld display device, a user's retina or smart glasses.

18. The system of claim 11 wherein the item printed object comprises a product or service manual and the method further includes triggering of specific information that will allow a user to understand how a product works by providing technical drawings.

19. The system of claim 11 wherein the selected media item comprises a call button.

\* \* \* \* \*